United States Patent [19]

Collins et al.

[11] Patent Number: 4,828,089

[45] Date of Patent: May 9, 1989

[54] BRAKE/CLUTCH WITH DIRECT LIQUID COOLING

[75] Inventors: Marcus H. Collins, Akron, Ohio; Peter S. Winckler, Brimingham, Mich.

[73] Assignee: Eaton Corporation, Cleveland, Ohio

[21] Appl. No.: 118,377

[22] Filed: Nov. 9, 1987

Related U.S. Application Data

[63] Continuation of Ser. No. 731,639, May 7, 1985, abandoned.

[51] Int. Cl.$^4$ .................. F16D 13/72; F16D 65/853; F16D 69/02
[52] U.S. Cl. .................. 192/70.12; 192/107 M; 192/113 B; 188/71.6; 188/251 A; 188/264 D; 188/264 E
[58] Field of Search ............ 192/70.12, 107 M, 113 B; 188/71.6, 251 A, 251 R, 264 B, 264 D, 264 E, 264 P

[56] References Cited

U.S. PATENT DOCUMENTS 2,821,273  1/1958  Sanford et al. ............... 188/71.6 X
4,700,823  10/1987  Winckler .................. 192/107 M Primary Examiner—Rodney H. Bonck
Assistant Examiner—Richard M. Lorence
Attorney, Agent, or Firm—P. S. Rulon

[57] ABSTRACT

A brake, clutch, or continuous slip device (12) having a pyrolytic carbon composite friction material (108) directly cooled by water or an ethylene glycol/water solution. Coolant of cooling device (12) may be tapped from a radiator (24) for a prime mover (14). The brake, clutch, or continuous slip device includes a plurality of interdigitated friction discs (74, 76) defining confronting friction surfaces (74b, 76B). One or both confronting friction surfaces have the pyrolytic carbon composite friction material bonded thereon. The material preferably has a bulk density of 0.7 to 1.2 grams/cc.

18 Claims, 4 Drawing Sheets

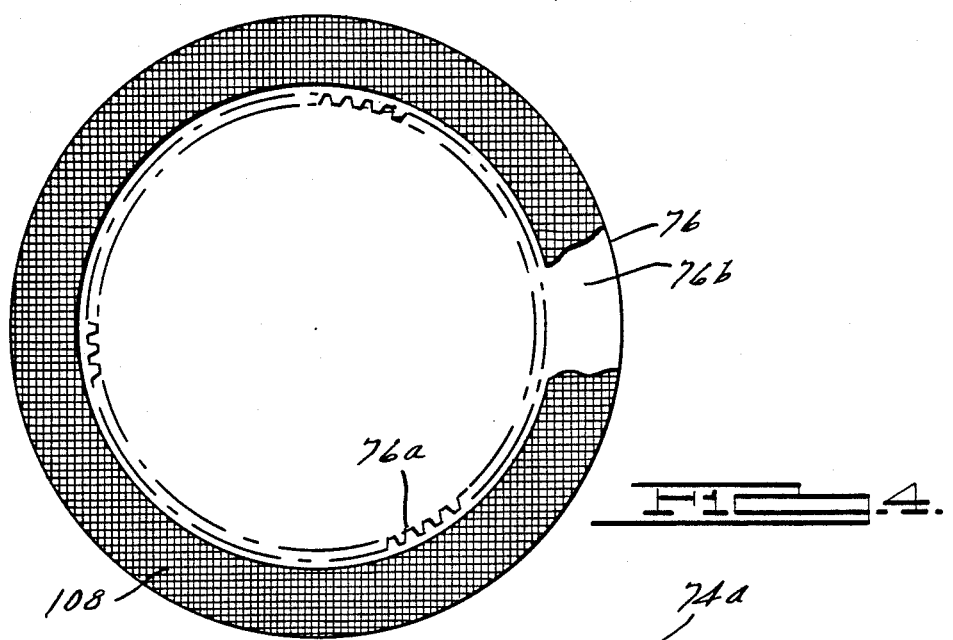
FIG. 4.
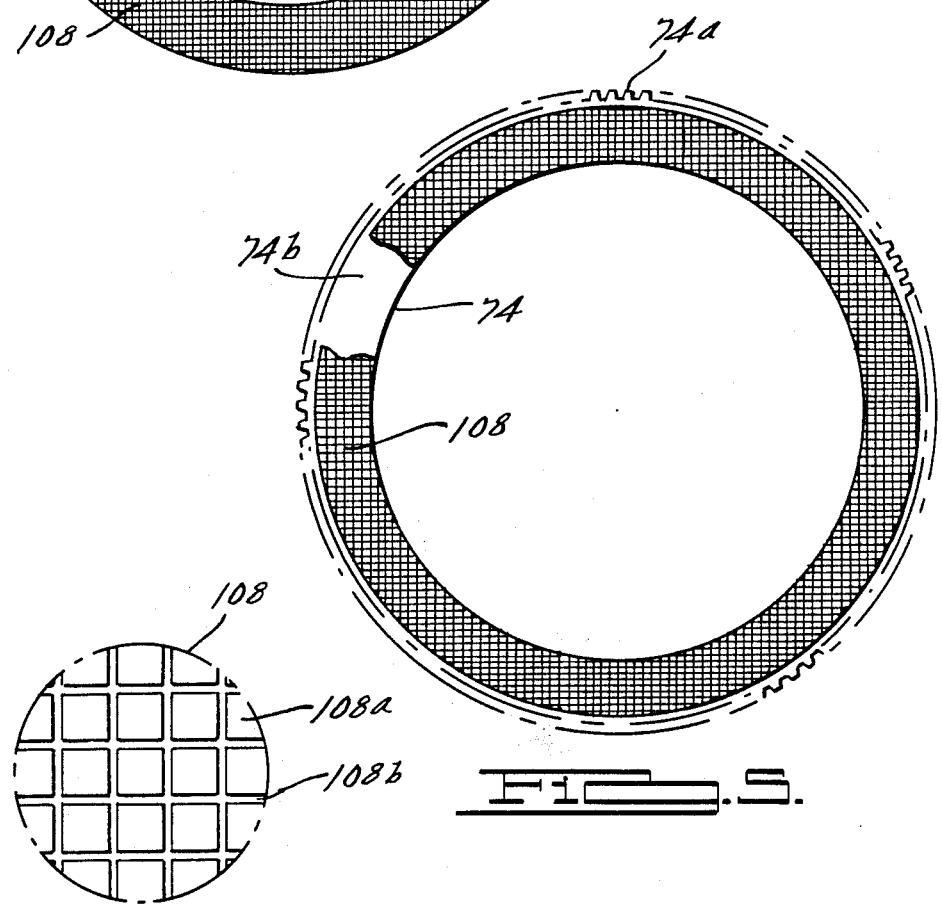
FIG. 5.
FIG. 5A.

BRAKE/CLUTCH WITH DIRECT LIQUID COOLING

This application is a continuation of application Ser. No. 731,639 filed May 7, 1985, now abandoned.

FIELD OF THE INVENTION

This invention relates to friction brakes and clutches and, in particular, to direct liquid cooling of friction material of high power density brakes and clutches in continuous slip applications.

BACKGROUND OF THE INVENTION

Friction brake and clutch devices generally employ relatively rotatable members having substantially solid, mutually facing friction surfaces which frictionally engage to absorb and/or transmit kinetic energy. One of the surfaces is typically defined by a so-called friction material. Relative rotation of the friction sufaces, while they are engaged, of course, converts the slip portion of the kinetic energy to heat. Friction brake devices are typically thought of as power absorbers and friction clutch devices as power transmitters. However, in many applications, friction clutch devices may have relatively long continuous slip duty cycles and, therefore, have to absorb great amounts of power in the form of heat. If prolonged or continuous slip duty cycles of brake or clutch devices are such that power absorption causes overheating, the devices are designed to dissipate the heat at a rate sufficient to prevent the damaging effects of overheating. Overheating is known to cause undesirable friction material performance including variations in the coefficient of friction such as temporary or permanent fade, accelerated wear and failure of the friction material, complete failure of the device, fire, etc.

The vast majority of brakes and clutches are used in applications requiring relatively short duty cycles. Most clutch engagements are characterized by high peak or instantaneous energy absorption and low total energy absorption per duty cycle. Clutch engagement duty cycles are typically a maximum of two seconds with high loading per square unit of friction material surface; for example, the peak energy rate often varies from 0.5 to 5 hp/in$^2$ (57.8 to 578 watts/cm$^2$) of friction surface; and total energy absorption is low due to the short duty cycle.

Most brake engagements are characterized by somewhat lower instantaneous energy absorption peaks but relatively higher total energy absorption per duty cycle. Brake engagement duty cycles are typically 2–30 seconds with moderate loading per square unit of friction material surface; for example, average energy rate often varies from 0.5 to 0.1 hp/in$^2$ (57.8 to 11.6 watts/cm$^2$) of friction surface; and total energy absorption is normally higher than for clutch engagements due to the longer duty cycles. Further, to reduce fade and other undesirable characteristics, such as excessive wear, an average energy rate of less than 0.5 hp/in$^2$ (11.6 watts/cm$^2$) is often recommended.

Clutches and brakes used in continuous slip applications, i.e., duty cycles typically much longer than 30 seconds, are characterized by low instantaneous energy absorption per duty cycle. Brakes and clutches rated for continous slip are, preferably, capable of 6 to 12 minute duty cycles. The average energy rate is typically less than 0.1 hp/in$^2$ (11.6 watts/cm$^2$) of friction surface; however, total energy absorption per square unit of friction surface may be 800 times greater than the total energy absorption of a typical clutch engagement or duty cycle.

The continuous presence of liquid on the friction surfaces in brake and clutch devices typically determines whether the devices are classified as dry or wet. Friction surfaces which run dry, typically in free air, are classified as dry friction devices. Friction surfaces running in a liquid or having a liquid flowing therebetween are typically classified as wet devices. The dry devices are often cooled only by air conduction and/or convection; however, such devices may be indirectly cooled by a liquid such as disclosed in U.S. Pat. No. 2,821,271 to Sanford and drawn to a motor vehicle brake cooled by an ethylene glycol/water solution taken from the vehicle radiator. Effectiveness of indirect cooling depends greatly on the thermal conductivity of the material between the friction surfaces and the liquid coolant. A friction material which is run dry typically wears several hundred times as fast as the same material run wet in a given application. Further, dry friction materials are substantially more susceptible to chatter/stick-slip and fade.

It is known that continuous slip power absorption, per square unit of a friction surface in brake and clutch devices, may be raised substantially by direct liquid cooling of the friction surfaces. Direct liquid cooling also greatly reduces the wear rate of the friction materials. The liquid is typically an oil as disclosed in U.S. Pat. No. 4,291,794 and as disclosed in applicant's published European Patent Application 0,037,104. Direct water cooling of a brake having a molded asbestos friction material is proposed in U.S. Pat. No. 2,887,961 to Hawley. However, such direct water cooling of friction materials has had little or no lasting success. It is noted that the water coolant of Hawley does not recirculate and that water cooling of a somewhat related friction material, as discussed hereinafter, resulted in failure of the friction material. Oils so thoroughly dominate friction material cooling, that actual applications using water are virtually unknown or rare. This is so, particularly, in brake and clutch applications requiring continuous slip operation, such as in retarder and tensioner applications, where the lubricity of the oil seems to provide a protective hydroviscous effect which tends to lessen variations or transitions in friction coefficients. Such variations or transitions are associated with the phenomenon of chatter/stick-slip which often becomes pronounced as the relative speed of the friction surfaces decrease.

Oils, however in spite of their great use, do have several disadvantages in many applications. Oils greatly decrease the coefficient of friction of the friction surfaces and, thereby, require higher actuation forces, an increased number of friction surfaces, or an increase in the mean radius of the friction surfaces to obtain a given torque transmission or power absorption. Oils have a lower specific heat capacity than water or water solutions, such as water/glycol solutions or water/oil solutions. Therefore, a given cooling capacity requires greater amounts of circulating oil. Similarly, it is well known that the heat transfer properties of oil in heat exchangers is substantially less than that of water. Hence, oil coolant systems require larger heat exchangers. Oils are more expensive than water and most water solutions, and many brake/clutch applications require a redundant or separate cooling system when the coolant is oil. Oils are typically flammable and therefore potentially hazardous in their applications, whereas water or water solutions, such as ethylene glycol/water or many water oil solutions are fire resistant. And last but not least, the hydroviscous effect of oil seems to break down as the relative speed of the friction surfaces gets very low or nears zero. At these relative speeds, the chatter/slick-slip phenomenon often becomes very pronounced and the coefficient of friction increases rapidly with resultant premature lockup and high lockup torque spikes.

SUMMARY OF THE INVENTION

An object of this invention is to provide a high power density friction brake/clutch device capable of continuous slip operation, and substantially free of chatter/stick-slip and high lockup torque spikes as the relative speeds of the friction surfaces become low or nears zero.

According to a feature of the present invention, a brake/clutch mechanism includes at least two members having confronting friction surfaces mounted for relative rotation, means to frictionally engage the confronting surfaces to retard the relative rotation, characterized by: a carbon composite friction material defining at least one of the confronting friction surfaces and formed of a carbon fiber substrate coated with pyrolytic carbon by chemical vapor deposition; grooves formed in one of the friction surfaces; and a system operative to force flow cooling water through the grooves to effect direct cooling of the confronting surfaces.

According to another feature of the present invention, the water is contained in an ethylene glycol/water solution.

According to another feature of the invention, the carbon composite friction material has a bulk density of 0.7 to 1.2 grams/cc.

According to another feature of the invention, both confronting friction surfaces are defined by the carbon composite friction material formed of the carbon fiber substrate coated with pyrolytic carbon by chemical vapor deposition.

BRIEF DESCRIPTION OF THE DRAWINGS

The preferred embodiment of the present invention is shown in the accompanying drawings in which:

FIGS. 4, 5, 5a are enlarged views of components in the brake/clutch device.

DETAILED DESCRIPTION OF THE DRAWINGS

Figure 1:
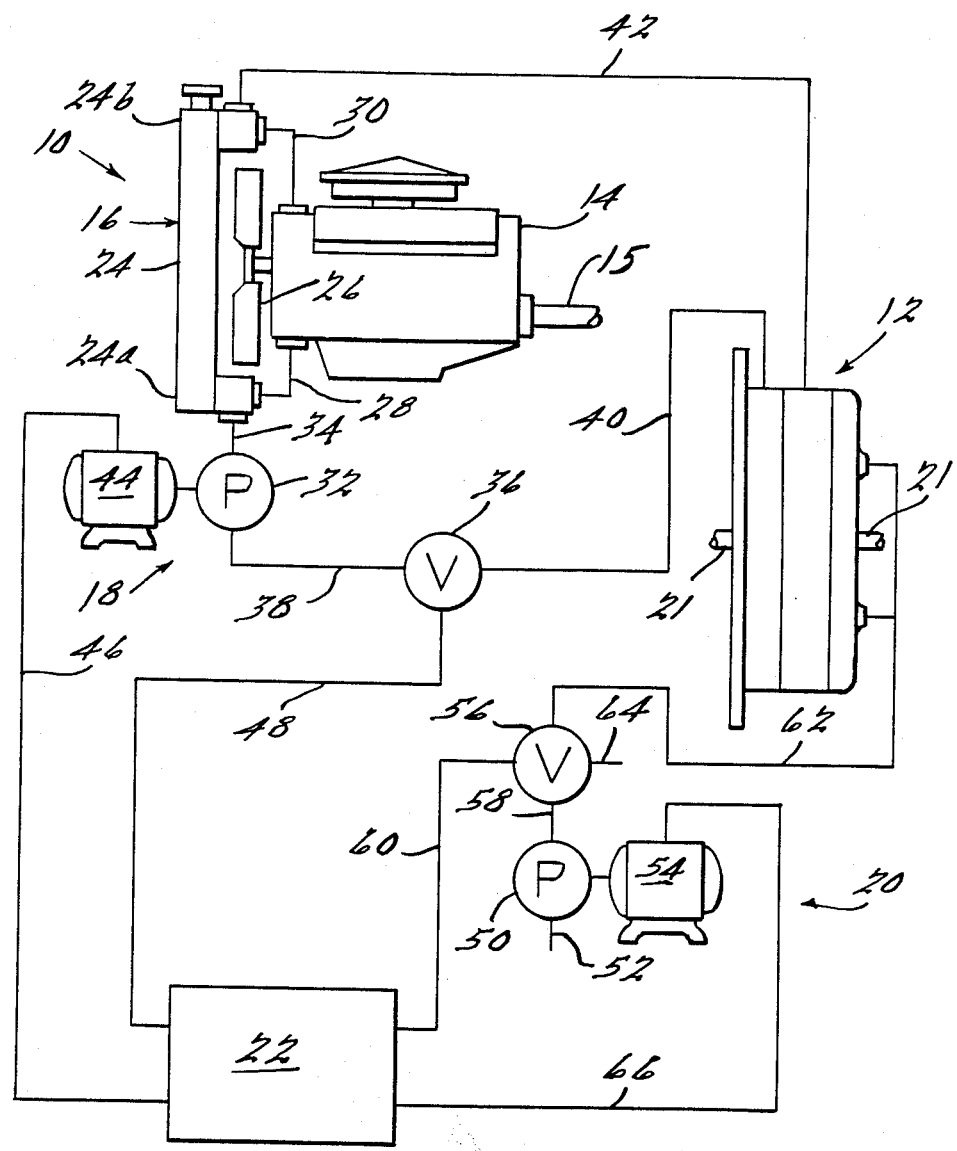
FIG. 1 is a system schematic for cooling and engaging the brake clutch device of the present invention.

FIG. 1 schematically illustrates a cooling and an engagement system 10 for a brake/clutch device 12. The brake/clutch device is intended for use in intermittant or continuous slip applications requiring high torque and horsepower absorption. For example, device 12 may be sized to develop torque from 4,250 lb-ft (5,762 Nm) to 150,000 lb-ft (203,373 Nm) and for continuous thermal capacities from 100 hp (74.6 KW) to 1,960 hp (1,462.2 KW). However, device 12 is not limited to such use and with minor modification may be used in relatively low horsepower applications where high power density and smooth braking or clutching action is desired, e.g., the device is well suited as a brake or retarder for vehicles such as buses and trucks. The device as disclosed herein is ideal for heavy-duty industrial braking and tensioning applications such as those found in metal and paper processing, mobile applications such as power line stringing equipment and yarders, oil well drilling rigs, and in marine mooring, winching and dredging operations. The device is particularly suited for applications involving starting and stopping heavy loads, rapid cycling, and quick load reversals.

Brake/clutch device 12 employs a non-asbestos, pyrolytic carbon composite friction material directly cooled by water or, in a preferred form of the invention, directly cooled by an ethylene glycol/water solution. The combination of direct cooling of the pyrolytic carbon composite friction material with water, particularly an ethylene glycol/water solution, has produced excellent, unexpected results. The device is capable of 0.3 hp absorption per square inch (34.7 w/cm$^2$) of friction material during continuous slip operation without harm to the friction material; this continuous level of hp absorption is substantially greater than is safely obtainable with other friction materials whether they are run wet or dry. In continuous slip modes of operation, the coefficients of friction of the pyrolytic carbon composite friction materials are relatively constant whether the relative speeds of the friction surfaces are high, low, or near zero. That is, the static and dynamic coefficients of friction varied substantially less than other friction materials, thereby substantially lessening the problems of chatter/slick-slip and torque lockup spikes. The coefficients are stable and reproducible over the life of the friction material even after abusive use. Hence, device 12 has a substantially constant and reproducible torque for given operating pressures and speeds which yields smooth operation and allows easy control. The direct cooling system for the mechanism may be open or closed-loop. In open-loop systems cooling liquid is discharged to a drain. In closed-loop systems, the cooling liquid is recirculated, e.g., automobile engine cooling systems. Closed-loop systems are preferred in applications having liquid cooled engines, such as mobile power yarders used in logging, the engine cooling system may be tapped to provide the coolant.

Figure 2:
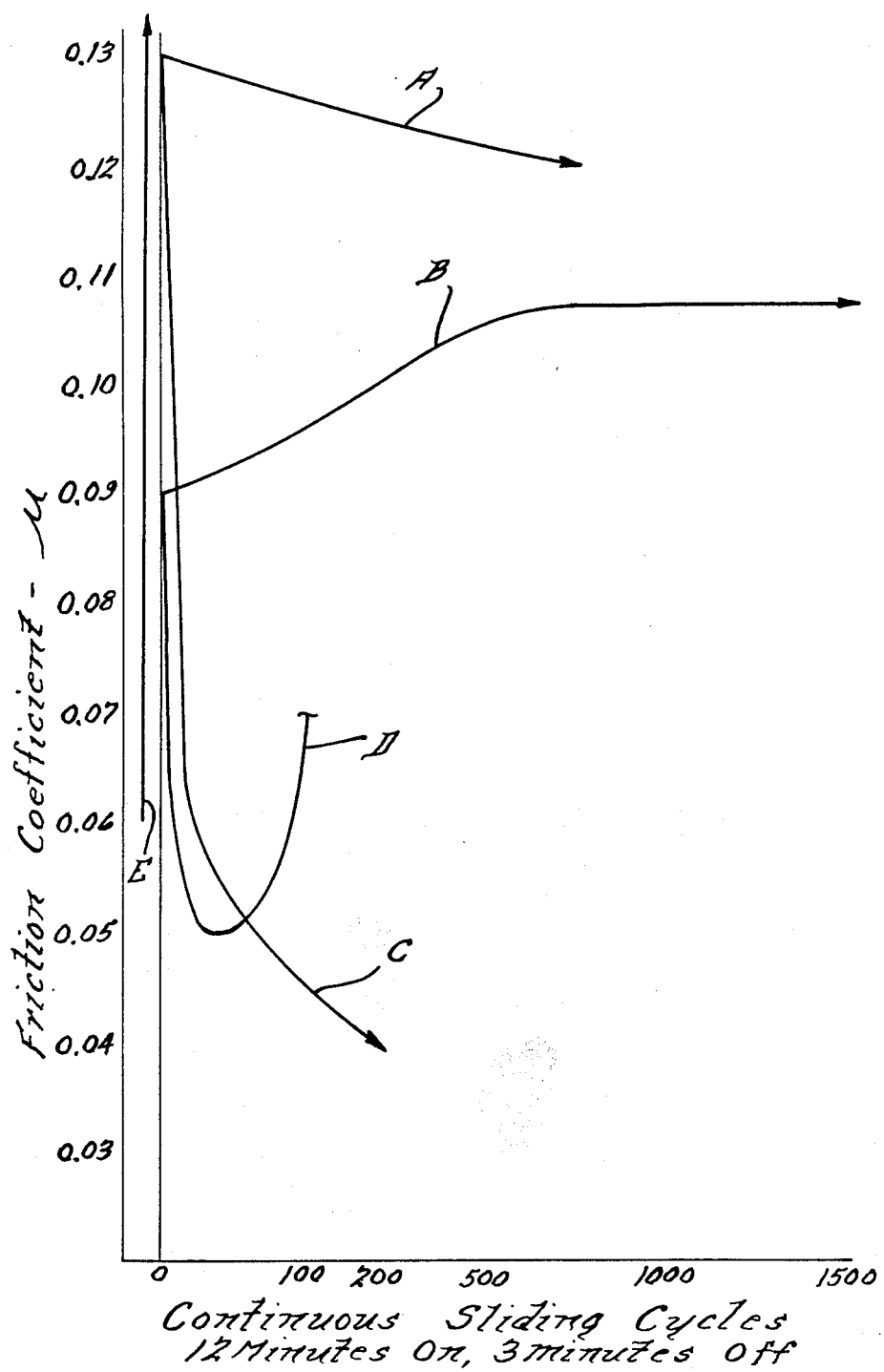
FIG. 2 is a graph illustrating and comparing the friction coefficient performance of two pyrolytic carbon composite friction materials in the brake/clutch device of the present invention with other friction materials.

The generalized curves in the graph of FIG. 2 compares continuous slip/endurance test data results of two pyrolytic carbon composite friction materials (A,B), having densities in the range of 0.8 to 1.1 grams/cc, with three commercially available friction materials normally cooled by oil and respectively formed of a reinforced phenolic material (C), a graphitic material (D) and a sintered bronze material (E). Materials A and B ran against themselves, i.e., both confronting friction surfaces were defined by pyrolytic carbon composite friction material. Materials C, D, and E ran against steel. All of the materials were grooved and cooled by an ethylene glycol/water solution. Pyrolytic carbon friction material A was formed of a carbon cloth or fabric substrate having a basket square weave and chemical vapor deposition (CVD) infiltrated or coated with pyrolytic carbon. Pyrolytic carbon friction material B was formed of a carbon cloth or fabric substrate having continuous filament fibers woven into an open square weave and CVD infiltrated or coated with pyrolytic carbon. The theoretical bulk density of materials A and B is about 2 grams/cc. The preferred density of materials A and B is 0.9 to 1.1 grams/cc and may be in the range of 0.7 to 1.2 grams/cc.

Carbon materials produced by CVD are generally referred to as pyrolytic carbon or graphite. Herein, carbon and graphite materials produced by CVD on a carbon or graphite substrate will be referred to as pyrolytic carbon composite material unless explicitly stated otherwise.

As may be seen in FIG. 2, only material B ran for the full 1500 cycle endurance test. The test of material A was terminated after 750 cycles once the long term wear rate was clearly established. Throughout the test, materials A and B had substantially no unrecoverable fade in coefficient, the coefficients of both did not waver more than 8%, and the coefficients of both tended toward an excellent range of 0.107 to 0.12. The test of material C was terminated after 215 cycles due to a 70%, unrecoverable fade in coefficient to 0.039; coefficients this low are akin to the coefficients of bearing surfaces and require engagement forces far too great for practical brake and clutch applications. The test of material D was terminated after 100 cycles due to spalling, i.e., failure of the material; the coefficient also varied by 45%. The test of material E was terminated prior to completion of any complete test cycles due to unacceptably high coefficients which indicated fusion of the friction surface. Other tests of materials A–E by applicant clearly show materials A and B to have substantially constant friction coefficients over wide speed ranges with very little increase in coefficient at incipient lockup, whereas the coefficients of friction of materials C, D, and E varied greatly over the same speed ranges and rose rapidly at incipient lockup.

Looking now specifically at system 10 in FIG. 1, therein is the brake/clutch device 12, an internal combustion engine 14 having a liquid cooling system 16 which also supplies coolant to a system 18 for direct cooling of device 12, an air system 20 for engaging device 12, and a control system 22 for automatically and/or manually regulating the cooling and engagement systems 18, 20. Cooling systems 16,18 are of the closed loop type. The engine includes an output shaft 15 operative to drive a load which may be connected to or connectable to the brake/clutch device via shaft 21.

The engine cooling system 16 includes a radiator 24 and an engine driven cooling fan 26 sized to handle the cooling requirements of the engine 14 and brake/clutch 12 in appropriate combination. Radiator coolant, which is preferably a 50/50 solution of ethylene glycol and water, flows from the radiator bottom 24a to the engine via a duct 28 and returns to the radiator top 24b via a duct 30.

The brake/clutch device cooling system 18 includes a pump 32 receiving coolant from the radiator bottom 24a via a duct 34, a valve 36 receiving pressurized coolant from the pump discharge via a duct 38 and operative when energized to allow flow of the pressurized coolant to the brake/clutch device 12 via a duct 40, and a duct 42 for returning the coolant to the radiator top 24b. As may be seen, cooling system 18 is disposed in series-parallel with cooling system 16, i.e., system 18 is in series with radiator 24 and in parallel with the remainder of system 16. Pump 32 is preferably of the impeller type and is driven by an electric motor 44 receiving electrical power from the control 22 via a line 46. Pump 32 may be driven by engine 14. Valve 36 opens in response to an electrical signal from control 22 on a line 48. The amount of coolant flow to device 12 may be controlled by regulating the displacement of pump 44 or providing valve 36 with a flow control function. The difference in coolant temperature in ducts 40, 42 may be sensed to provide a signal for regulating coolant flow.

Brake/clutch device 12 may be fluid pressure engaged and spring released or spring engaged and fluid pressure released. When air pressure engagement is used, as disclosed herein, system 20 includes an air compressor or pump 50 receiving atmospheric air via a duct 52, an electric motor 54 driving the compressor, and a pressure regulator valve 56 receiving pressurized air from the compressor discharge via a duct 58 and operative, when energized by a variable electrical signal on a line 60, to regulate the pressure of the air to device 12 via a duct 62. A duct 64 vents duct 62 to atmosphere when the signal on line 60 is removed. Electric motor 54 receives electrical power from control 22 via a line 66.

Figure 3:
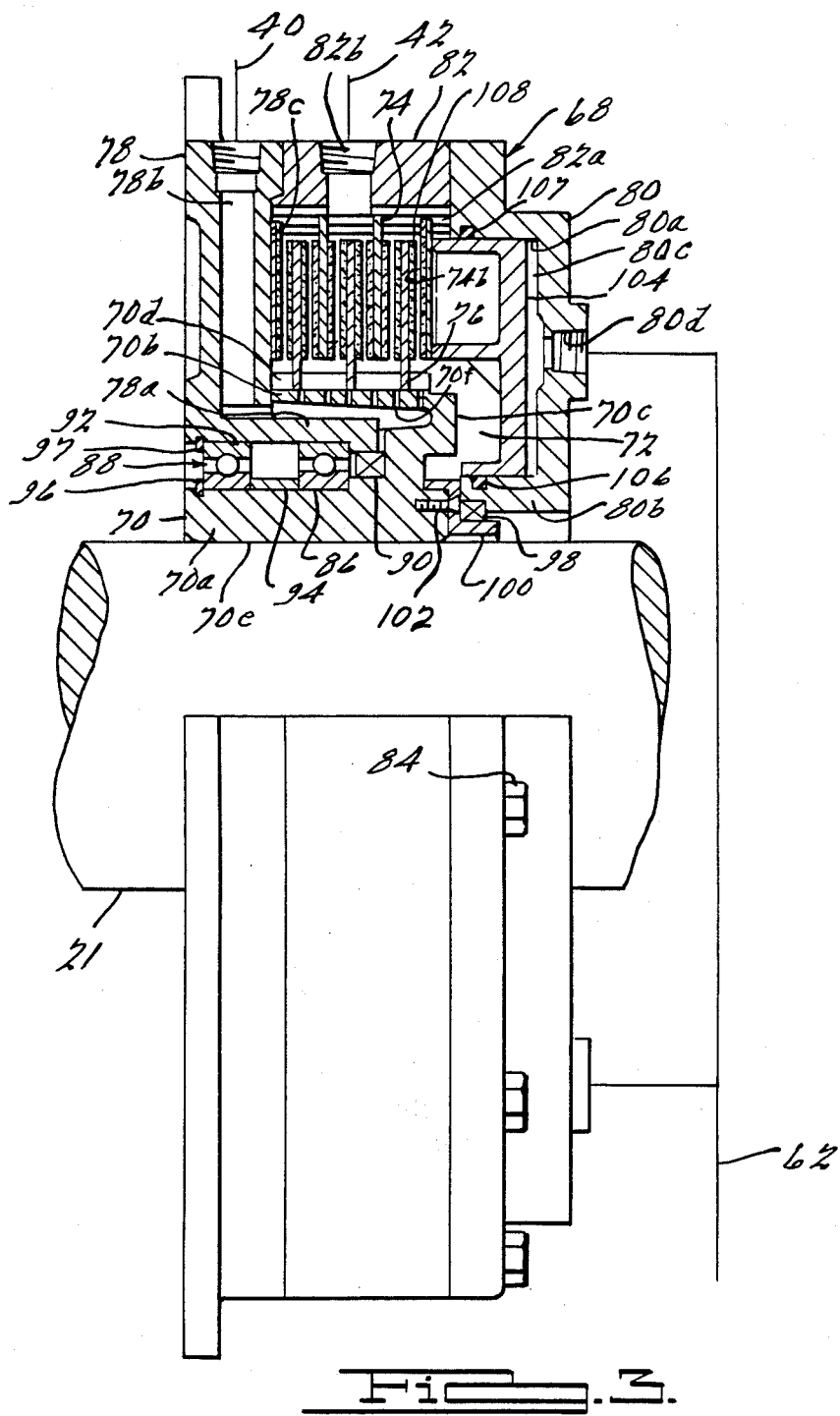
FIG. 3 is a partially sectioned view of the brake/clutch device.

Looking now at device 12, as depicted in the partially sectioned view of FIG. 3, therein is an outer, non-rotating, housing assembly 68, which adapts device 12 to function as a brake, and an inner, rotatable, housing member 70. The outer and inner housings define an annular chamber 72 containing a plurality of interdigitated friction plates 74, 76 which are shown in greater detail in FIGS. 4, 5, and 5a. Outer housing assembly 68 includes an annular mounting member 78 having an inner hub portion 78a, an annular cylinder or face member 80 defining an annular cylinder 80a, and an annular ring member 82 having internal splines 82a which slidably mate with external splines 74a of friction plates 74. Members 78, 80, 82 are sealingly secured together by a plurality of screws 84.

Inner housing member 70 includes concentric hub portions 70a, 70b secured together by a radially extending flange portion 70c and defining an annular recess embracing hub portion 78a of housing member 78. The radially outer surface of hub portion 70b includes a plurality of external splines 70d which slidably mate with internal splines 76a of friction plates 76. An inner peripheral surface or bore 70e of inner hub portion 70a is adapted for receiving the load shaft 21 via an unshown keyway. The radially outer peripheral surface of inner hub portion 70a provides a support for inner races 86 of ball bearing assemblies 88 and a running surface for a dynamic seal 90 which seals the bearing assemblies from chamber 72. Seal 90 may be of the double lip, elastomer-type and is passed, at its outer periphery, into an inner peripheral surface of hub portion 78a. A second inner peripheral surface of hub portion 78a supports the outer races 92 of the bearing assemblies. The bearing assemblies are sealed and self lubricating, are spaced apart by a sleeve 94, and are retained by a snap rings 96, 97. Chamber 72 is also sealed by a dynamic seal 98 pressed at its outer periphery into an annular recess defined by an inner, axially extending wall portion 80b of housing member 80. Seal 98 may be of the double lip, elastomer-type. The lips of seal 98 run against an outer peripheral surface of an annular member 100 having a z-shaped cross-section and secured to the right end of hub portion 70a by a plurality of screws 102. Plates 74, 76 are directly cooled by the ethylene glycol/water solution flowing into chamber 72 via a radially extending passage 78b, distributively across the friction surfaces of plates 74, 76 via a plurality of radially extending passages 70f in hub portion 70b, and out of the chamber via a radially extending passage 82b in member 82.

Annular cylinder 80a contains an annular piston 104 slidably disposed therein to define an expandable air chamber 80c sealed from chamber 72 by ring seals 106, 107 and communicating with pressurized air in conduit 62 via a plurality of threaded ports 80d. Piston 104 is operative to frictionally interconnect inner housing 70 with outer housing 68 by squeezing the friction plates leftward against a reaction surface 78c defined by housing member 78. With reference to FIGS. 4 and 5, plates 74, 76 are flat steel discs having relatively smooth, oppositely facing, annular surfaces 74b, 76b. Surfaces 74b, 76b are both preferably provided with pyrolytic carbon composite friction material 108 bonded thereon to define annular confronting friction surfaces 108a. Alternatively, one of the confronting friction surfaces may be defined by the pyrolytic carbon and the other by the steel surface of the adjacent disc.

Friction material 108 may be formed of multiple layers of carbon or graphite cloth substrate highly densified by CVD infiltration as disclosed in U.S. Pat. No. 3,895,084. However, the material is preferably formed of a single layer of carbon or graphite cloth substrate coated or infiltrated by chemical vapor deposition (CVD) for relatively short periods of time. Samples of the single layer material are shown in the previously mentioned U.S. Pat. No. 4,291,794 and published European Patent Application 0,037,104. The cloth substrate is preferably a woven cloth and the fibers defining the substrate are preferably formed from carbonized rayon or polyacrylonitrile (PAN). However, other carbonized fibers may be used. The single layers of substrate may be densified or coated with pyrolytic carbon as taught by the batch process of previously mentioned U.S. Pat. No. 4,291,794 or the continuous process taught in U.S. Pat. Nos. 3,944,686 and 4,048,953. The texture of the substrate after light coating or infiltration with pyrolytic carbon varies with the weave of the fabric. When coarse, open mesh, square or plain weave is used, the coarse fabric texture and open mesh of the final material is readily discerned as well as the yarns and many of the fibers or filaments defining the yarns. In any case, the final material has a bulk density substantially less than the theoretical density of carbon. The bulk density of the final material seems to depend somewhat on the fabric weave and type of fiber (e.g., spun yarn, continuous filament, etc.). Excellent results have been obtained with final materials having a bulk density of 0.7 to 1.2 grams per cubic centimeter and a thickness of about 0.030 inches (0.076 cm). Excellent bonds of the material to the friction and separator plates have been obtained with nitrile-phenolic adhesive marketed by 3M Company as 3M Brand, AF15, High Temperature Thermo-Set Adhesive applied 0.006 inches thick and cured at 350° F. to 400° under a 150 psi (10.5 Kg/cm$^2$) load for one hour. After bonding, the material may be lightly machined or ground to minimize wear-in of the material during initial use. Preferably, at laeast one of the friction surfaces had grooves 108b as shown in FIG. 5a to facilitate flow of cooling liquid between the engaged friction surfaces. Any of several well known grooving patterns may be used.

A preferred embodiment of the invention has been disclosed for illustrative purposes. Many variations and modifications of the preferred embodiments are believed to be within the spirit of the invention. For example, the single woven layer of the guickly densified material 108 may include two or three tightly interwoven layers of fabric or may be a felt cloth of carbon or graphite fibers. The following claims are intended to cover the inventive portions of the preferred embodiment and modifications believed to be within the spirit of the invention.

What is claimed is:

1. In a system including a power absorption device having at least two members defining confronting friction surfaces mounted for relative rotation; means to frictionally engage the confronting surfaces to retard the relative rotation; the system characterized by:

a carbon composite friction material defining at least one of the confronting friction surfaces, said friction material defined by a carbon fiber substrate coated with pyrolytic carbon by chemical vapor deposition;

grooves formed in at least one of the confronting friction surfaces; and a closed loop cooling system operative to force flow ethylene glycol/water solution through said grooves to effect direct cooling of the confronting friction surfaces.

2. The system of claim 1, wherein said confronting friction surfaces are both defined by said carbon composite friction material.

3. The system of claim 1, wherein said ethylene glycol/water solution is 50/50 by volume.

4. The system of claim 1, wherein said carbon fibers defining said substrate are woven into a single layer of cloth.

5. The system of claim 4, wherein said coating of pyrolytic carbon is deposited on said substrate to a level forming a composite friction material having a relatively open mesh.

6. The system of claim 5, wherein the other of the friction surfaces is defined by said composite friction material having said relatively open mesh.

7. The system of claim 4, wherein said carbon composite friction material has a bulk density of 0.7 to 1.2 grams per cubic centimeter.

8. The system of claim 7 wherein said confronting friction surfaces are both defined by said carbon composite friction material.

9. The system of claim 4, wherein said ethylene glycol-water solution is 50/50 by volume.

10. The system of claim 4, wherein said carbon composite friction material has a bulk density of 0.9 to 1.1 grams per cubic centimeter.

11. In a system including a power absorption device having at least two members with confronting friction surfaces mounted for relative rotation; means to frictionally engage the confronting surfaces to retard the relative rotation; a prime mover driving a load connectable to one of the members; a closed-loop cooling system including a first cooling loop having a radiator containing a liquid coolant solution of ethylene glycol/water and first and second ducts for respectively directing a water coolant from the radiator to the prime mover and from the prime mover to the radiator to effect cooling of the prime mover; the system characterized by:

a carbon composite friction material defining at least one of the confronting friction surfaces, said friction material defined by a carbon fiber substrate coated with pyrolytic carbon by chemical vapor deposition;

grooves formed in at least one of the confronting friction surfaces; and the closed-loop cooling system including a second cooling loop disposed in series with the radiator and in parallel with the first and second ducts and prime mover, said second loop operative to force flow the coolant from said radiator through said grooves to effect direct cooling of the confronting friction surfaces and back to the radiator.

12. The system of claim 11, wherein the power absorption device includes outer and inner housing members defining a chamber containing a plurality of interdigitated friction discs alternately fixed against rotation relative to the outer and inner housing members and defining the confronting friction surfaces on axially facing sides defined thereby, the outer housing member fixed against rotation and defining first and second passages for respectively directing the coolant of the second cooling system to and from the chamber, the inner housing member adapted to be fixed to the load, the inner housing member including a hub portion interposed between the first passage and the friction discs and defining a plurality of radially extending passages for directing coolant flow between the discs and the first passage, and a piston for squeezing the discs together to effect braking of the load.

13. The system of claim 12, wherein said confronting friction surfaces are both defined by said carbon composite friction material.

14. The system of claim 13, wherein said carbon fibers defining said substrate are woven into a single layer of cloth.

15. The system of claim 14, wherein said coating of pyrolytic carbon is deposited on said substrate to a level forming a composite friction material having a relatively open mesh.

16. The system of claim 14 wherein said carbon composite friction material has a bulk density of 0.7 to 1.2 grams per cubic centimeter after being coated with said pyrolytic carbon.

17. The system of claim 16, wherein said water is contained in an ethylene glycol/water solution.

18. The system of claim 15, wherein said carbon composite friction material has a bulk density of 0.7 to 1.2 grams per cubic centimeter.

* * * * *